United States Patent [19]

Smith, Jr. et al.

[11] Patent Number: 4,459,479

[45] Date of Patent: Jul. 10, 1984

[54] DETERMINATION OF CASING THICKNESS USING A NATURAL GAMMA RAY SPECTROSCOPY TECHNIQUE

[75] Inventors: Harry D. Smith, Jr.; Dan M. Arnold; Carl A. Robbins, all of Houston, Tex.

[73] Assignee: Halliburton Company, Duncan, Okla.

[21] Appl. No.: 395,517

[22] Filed: Jul. 6, 1982

[51] Int. Cl.$^3$ ............................................. G01V 5/00
[52] U.S. Cl. .................................................. 250/256
[58] Field of Search ........................ 250/256, 264, 265

[56] References Cited

U.S. PATENT DOCUMENTS 2,881,324  4/1959  Scherbatskoy ....................... 250/264
4,048,495  9/1977  Ellis ..................................... 250/264
4,129,777 12/1978  Wahl et al. .......................... 250/264

Primary Examiner—Janice A. Howell
Attorney, Agent, or Firm—W. J. Beard

[57] ABSTRACT

A method of well logging utilizing naturally occurring gamma radiation is disclosed. In the preferred and illustrated embodiment, the thickness of the casing in a well borehole is measured. The photoelectric absorption of gamma rays from the formation by the iron in the casing varies as a function of the energy of the gamma radiation. The detected gamma spectrum below about 350 KeV from the surrounding earth formation is preferably divided into two energy ranges or windows, and a ratio between the two to indicate the thickness of any intervening steel casing material. With suitable scale factors in calibration of the system, casing thickness can be determined from the ratio of the summed naturally occurring gamma count rate in the range of about 35 to about 120 KeV divided by the count rate in a higher energy range from about 180–325 KeV.

16 Claims, 4 Drawing Figures

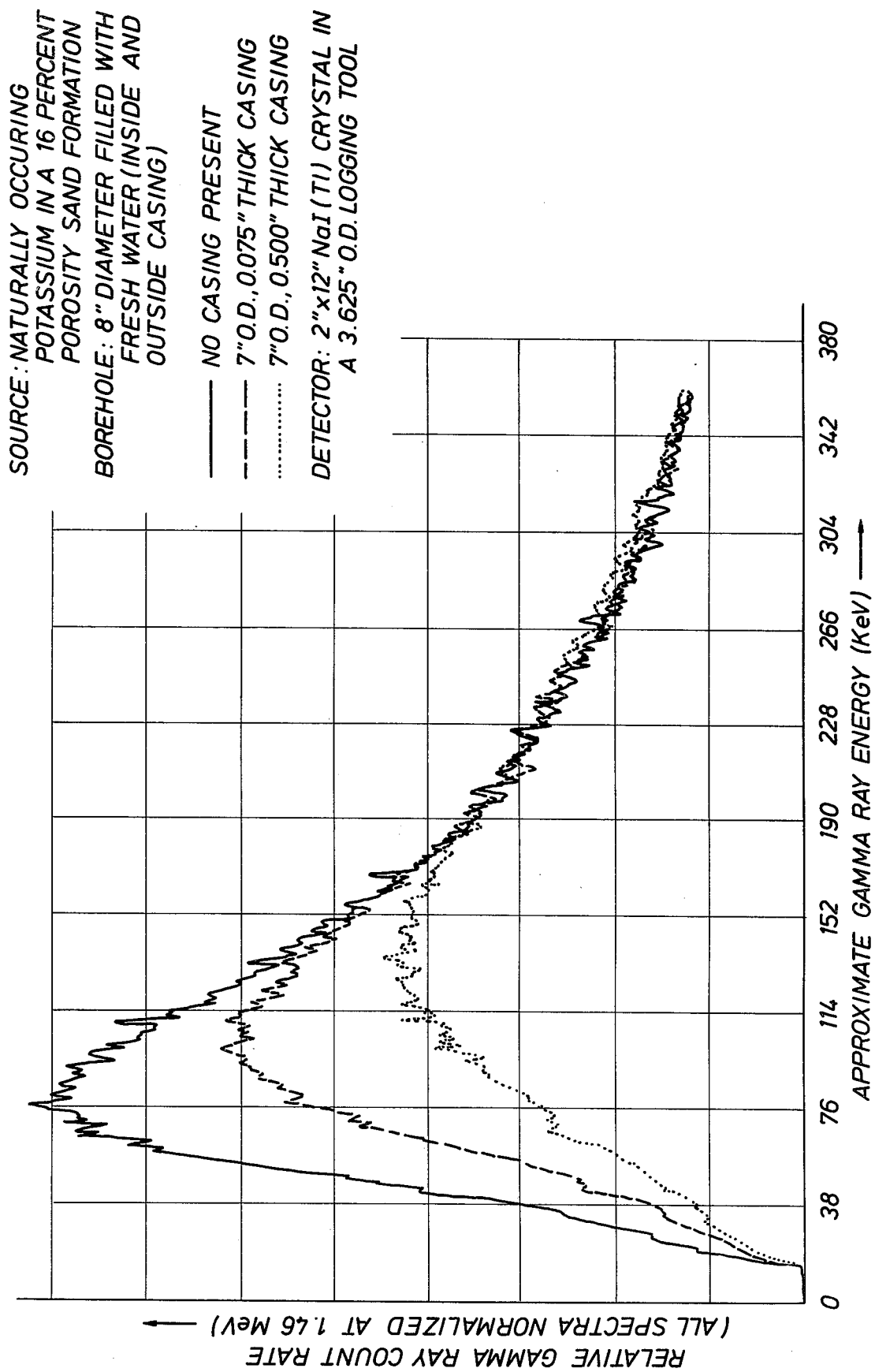

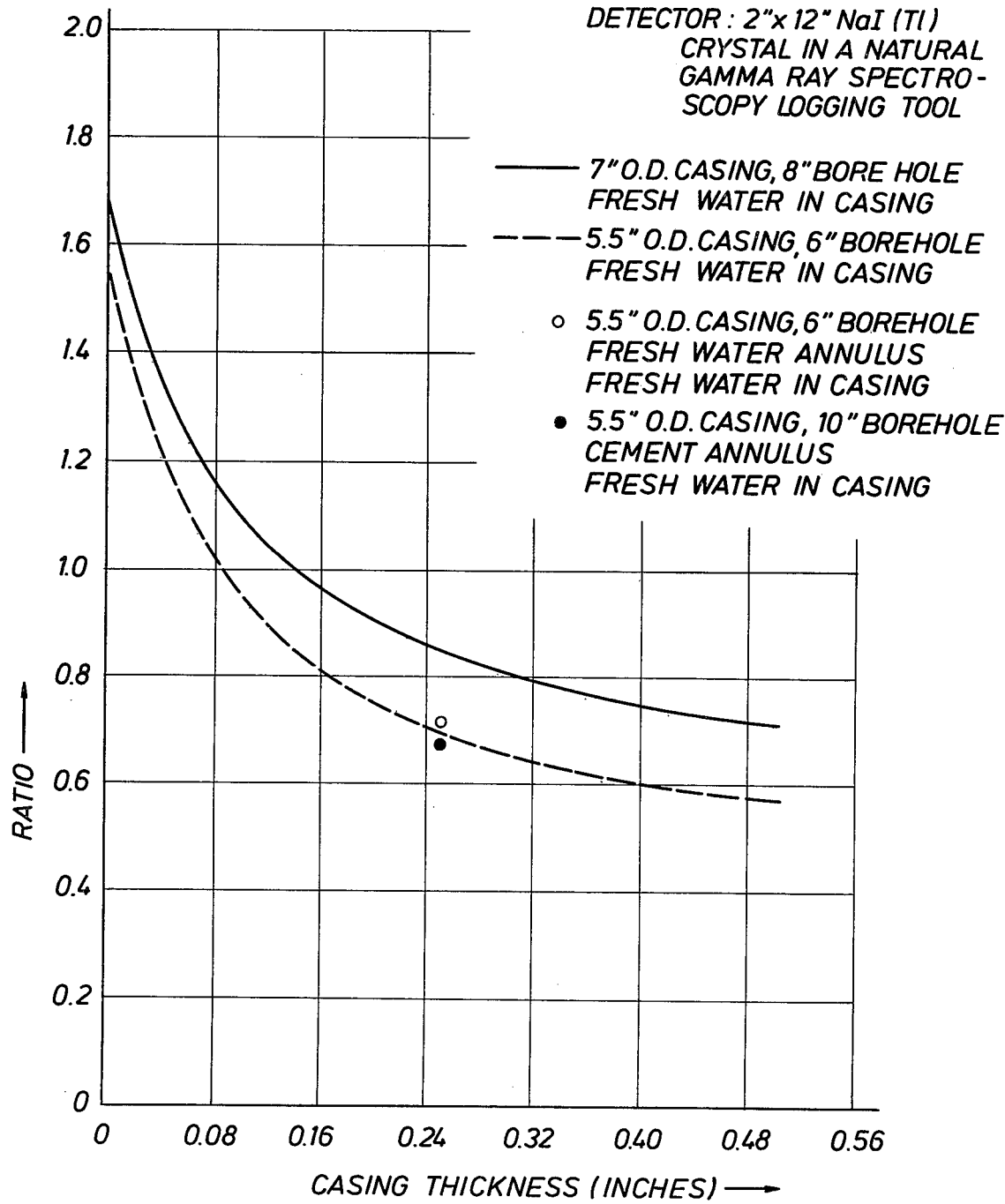

DETERMINATION OF CASING THICKNESS USING A NATURAL GAMMA RAY SPECTROSCOPY TECHNIQUE

FIELD OF THE INVENTION

The present invention is concerned generally with detecting naturally occurring gamma radiation from earth formations penetrated by a well borehole having a casing placed therein. This invention is concerned with measuring thickness, or equivalently, weight per unit length, of the casing. More specifically, the invention concerns methods and apparatus for detecting natural gamma radiation by measuring the count rate in specified energy ranges. The energy ranges are defined dependent on the photoelectric absorption by iron across the defined spectral ranges. The detected, naturally emitted gamma rays are summed and a ratio is obtained to indicate casing thickness, which can vary due to corrosion or wear. The technique also locates collars, perforations and other variations in casing thickness or weight.

BACKGROUND OF THE INVENTION

In recent years, gamma ray spectroscopy of earth formations adjacent to a well borehole has been enhanced by highly stable scintillation detectors. They are normally mounted in a sonde which is lowered in a well borehole. They produce a pulse height spectrum proportional to the gamma ray energy spectrum of the gamma rays impinging on the scintillation crystal. The present invention utilizes the naturally occurring gamma radiation emitted from earth formations. The gamma radiation is produced by potassium, uranium, thorium (and/or their daughter decay products).

This naturally occurring radiation is emitted isotropically from earth formations whereupon it is transmitted through the formation and borehole materials to impinge on a scintillation crystal in the well borehole. Photoelectric absorption, Compton scattering, and pair production attenuate the radiation between its source generation in the formation and its detection in the crystal. The crust of the earth is a layered medium composed, in large part, of silicon, hydrogen, carbon, calcium, chlorine, oxygen and other relatively low atomic weight elements. The same elements are principally present in cement, mud, and borehole water or oil between the formation and detector. The iron in casing has a higher atomic number than virtually all of these other elements, and also attenuates the naturally occurring gamma radiation prior to its being detected. However, significant photoelectric absorption in iron takes place at a higher energy level than in these other elements, and hence one can effectively isolate the attenuation due to iron from that due to other elements by using an energy dependent measurement of this photoelectric attenuation. This data, if properly normalized, can provide a measurement of the amount of iron (and hence casing thickness) which is present in a well.

Virtually all producing wells are cased. At the time that a well is cased, the casing program may be readily available whereby nominal casing thickness can be determined. However, many wells, due to changes in formation pressures as a function of depth, require several strings of different size casing to be incorporated into the drilling program. In drilling out below a depth to which casing has been set, it is possible that the casing may wear due to contact with the drill string used to drill out the deeper section in the well. This wear results in a decrease in casing thickness, which in turn weakens the casing. In many other instances, casing of a known thickness was installed in a well. However, after years of exposure to external deterioration caused by formation fluids, and internal deterioration due to produced fluids, corrosion may very well reduce the thickness, and hence strength, of the casing. In order to avoid casing collapse or blowouts, it is necessary to know the degree of wear or corrosion which has taken place, and to take remedial action if sufficient reduction in casing thickness has taken place. For these reasons, it is extremely valuable to be able to determine the thickness of the casing.

Photoelectric absorption is a gamma ray attenuation process whereby the gamma ray is completely removed in the interaction. The cross section, or probability, or photoelectric absorption ($\sigma$) is strongly affected by the energy E of the gamma ray and the atomic number, Z, of the element with which it interacts. This relationship is approximated by:

$$\sigma \sim (Z^{4.6}/E^3) \tag{1}$$

Since iron has a higher Z (=26) than most earth formation elements, below a given energy level (about 175 KeV), iron dominates this absorption process. Above about 200 KeV, photoelectric absorption in iron, as well as other principal downhole elements is not significant. Hence if iron is present in the formation or borehole in vicinity of the logging tool detector, then the count rate in the detector in the tool at energies below about 175 KeV is decreased relative to the count rate in a higher energy range in which range photoelectric absorption is not significant. In addition, since iron has a higher Z than other elements in cement and and borehole fluids, this relative attenuation increase in the lower energy range is virtually independent of changes in borehole geometry and composition. Changes in these variables will similarly influence count rates both below and above 175 KeV, as will changes in the density and lithology type of the formations from which the gamma rays are originally emitted. Of course, the concentration of radioactive source materials in the formation will also be similarly reflected both above and below 175 KeV.

Since casing thickness changes produce a pronounced relative count rate change (more than the other variations described above) in the very low energy region of the detected natural gamma spectrum, it is possible to isolate the effects of photoelectric absorption in iron. A ratio comparison of the summed counts in two energy ranges, one of which is sensitive to photoelectric absorption in iron, and (a higher) one in which photoelectric absorption in iron is negligible, is sensitive to changes in iron thickness, but not to changes in other downhole parameters. This ratio, when compensated for the geometrical differences between casings of different sizes, can be used to directly indicate the thickness of the casing in the borehole.

BRIEF SUMMARY OF THE PRESENT DISCLOSURE

This disclosure sets forth a method and apparatus for determining casing thickness. Through the use of a scintillation detector and pulse height analyzer connected to the detector, gamma ray photons arriving at the detectors in two energy bands, typically one being a low energy range of about 35 to about 120 KeV. The other is about 180-325 KeV, with the upper limit selected to minimize the difference between changes in the source type in the formation. The two ranges are on opposite sides of an inflection point occurring at about 150-175 KeV which is the threshold energy for significant photoelectric absorption in iron. As the ratio varies, it indicates a variation in thickness dependent on suitable scale and geometric factors employed. The procedures also detects casing collars and perforations in the casing.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 3 shows spectra recorded in a potassium rich sand formation for three different thickness of 7" O.D. casing present in the borehole, as measured in a 2"×12" NaI detector in a natural gamma ray logging tool; and FIG. 4 is a graph of a natural gamma ray photoelectric absorption ratio determined in accordance with the present invention versus casing thickness, for both 7" and 5.5" casings.

DETAILED DESCRIPTION OF PREFERRED AND ILLUSTRATED EMBODIMENT

Figure 1:
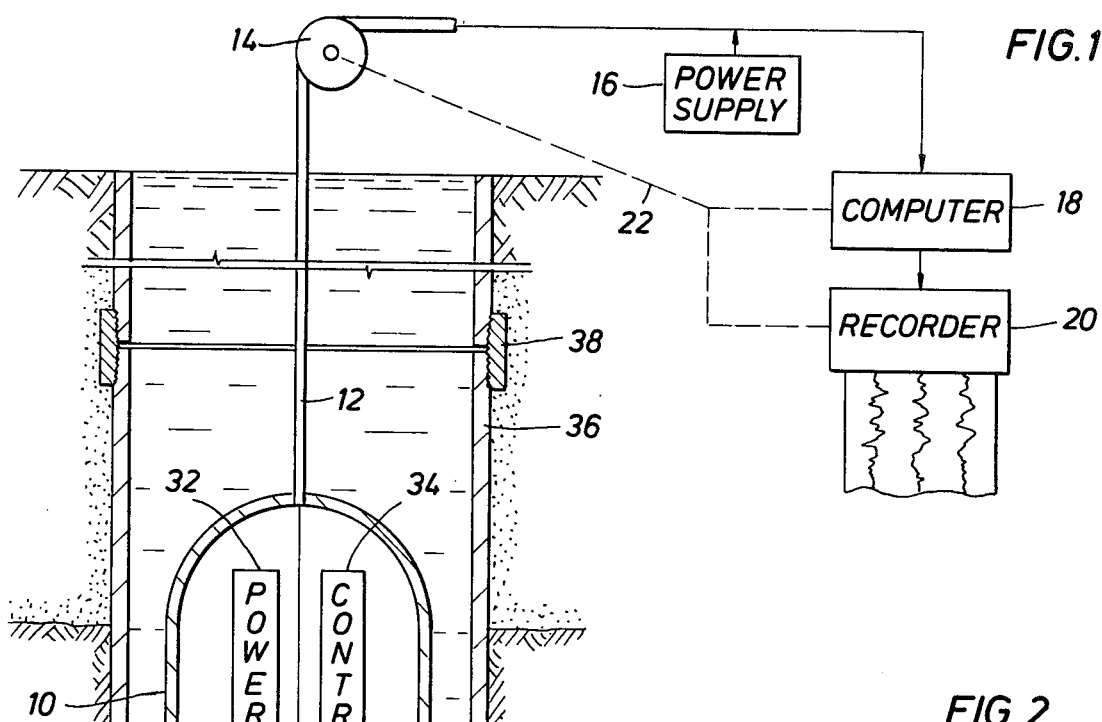
FIG. 1 is a schematic sectional view of a sonde in a well borehole penetrating earth formations and incorporating a scintillation detector responsive to naturally occurring gamma radiation from the earth's formations.

Attention is first directed to FIG. 1 of the drawings. A sonde 10 is suspended on a conventional multiconductor or single conductor armored well logging cable 12. The logging cable 12 extends to the surface and passes over a sheave wheel 14. The cable supports one or more conductors including a power supply system connected with a surface located power source 16. The logging cable 12 has conductors which are electrically coupled to a computer 18. The computer is connected to a recorder 20. In addition, the recorder 20 is mechanically or electrically connected with a sheave wheel 14 at 22 to transfer depth measurements of the sonde. The sonde 10 is lowered to the bottom of the well and a typical logging run progresses as the sonde, suspended on the logging cable is raised from the well. As it is raised, the depth information is transmitted from the sheave wheel 14 to the recorder. This enables data to be recorded on some suitable record as a function of depth in the wellbore.

The sonde 10 supports the logging apparatus of this disclosure. That apparatus includes a scintillation crystal 24. As an example, one suitable crystal is manufactured by Harshaw Chemical Company and is a NaI(TL) (Thallium activated) crystal. It is connected to a photomultiplier 26, a suitable model being an EMR 543 photomultiplier. The photomultiplier forms electrical signals which are input to a pulse height analyzer 28. That is connected with telemetry apparatus 30. The sonde also includes a power supply 32 and a suitable electronic control system 34. The sonde equipment is connected through the logging cable 12 to the surface equipment previously described. In ordinary operation, the sonde is decentralized (centralized operation is also feasible) in the borehole as it is pulled toward the surface. The sonde housing 43 could be composed of steel or titanium, but preferentially a material, such as a graphite fiber reinforced epoxy, which minimally attenuates low energy gamma rays.

The sonde 10 is lowered into a cased wellbore. The casing 36 supports occasional collars at the end of each joint of the casing, and one such collar is indicated at 38. The casing 36 may be very uniform in thickness, or it may be corroded or worn, either externally or internally, and thereby reduced in thickness. Also, perforations may be formed in the casing.

Figure 2:
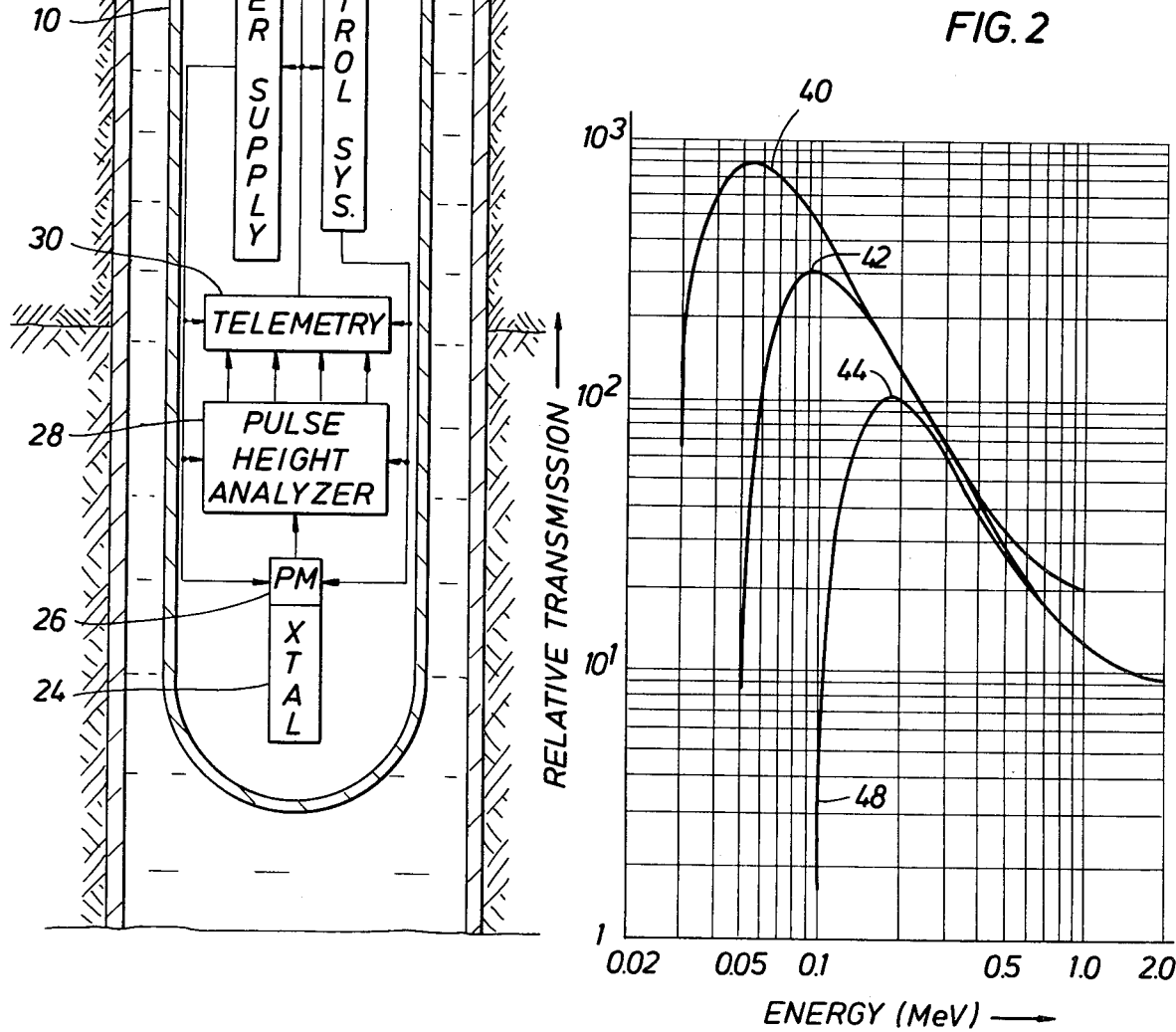
FIG. 2 shows three spectra of scattered gamma rays for oxygen, silicon and iron as a function of the energy level of the gamma ray photons.

Referring now to FIG. 2 of the drawings, this graph shows the relative attenuation characteristics per unit mass of oxygen, silicon and iron to incident gamma radiation as a function of gamma ray energy. FIG. 2 is from "Energy Distribution of Scattered Gamma Rays in Natural Gamma Logging" by J. A. Czubek and A. Lenda, IAEA Nuclear Techniques & Minerals Resources Transactions, Buenos Aires, Argentina, 1968. FIG. 2 depict the relative transmission spectra through the three elements. It assumes a gamma ray source within a homogeneous medium of the indicated material of infinite dimension, and the source is presumed to have the same strength in all spectra. The curve 40 is the relative transmission of oxygen ($Z=8$). Oxygen is more transparent to low energy gamma rays, providing less attenuation than the other two elements. The curve 42 is the relative gamma ray transmission of silicon ($Z=14$). The curve 44 sets out the gamma ray transmission characteristics of iron ($Z=26$). At higher energy levels, the three curves show similar relative attenuation characteristics. This indicates that gamma radiation from the earth formations are attenuated per unit mass more or less similarly by all three elements, which is a characteristic of Compton scattering, the dominent attenuation cross section in this energy range for these elements. Because of this similar relative attenuation at higher energies, the spectral shape of gamma rays reaching the detector will be virtually unaffected by changes in casing conditions, or changes in other downhole parameters. Of course, the absolute magnitudes of the count rates in these higher energy ranges will be altered by changes in borehole conditions, as well as to changes in the intensity of the gamma source in the formation.

Below about 200 KeV, the relative transmission curve of iron decreases sharply to the curved portion 48. This response indicates quite high attenuation for iron to low energy photons. This is especially true in the range from 35 to 120 KeV. Casing in the well borehole will thus effectively prevent low energy photons from arriving at the scintillation crystal 24.

FIG. 3 shows the detected gamma ray count rate as a function of energy for varying casing thickness in the same well borehole and formation. The three spectra were recorded in an 8" borehole surrounded by a 16% porosity sand formation containing a uniformly distributed potassium source, typical of the type and intensity of sources found in downhole formations. In all three spectra, the count rates were normalized in the unscattered potassium energy range at 1.46 MeV. The solid curve, is the spectrum recorded without casing present (0" thickness), the dashed curve for a 7" casing with 0.075" wall thickness, and the dotted curve for a 7" casing with 0.50" wall thickness. The ordinate is the observed detector count rate (arbitrary full scale value) in each of these borehole environments. The abscissa is the energy level of the impinging gamma ray photons. At the energy level of about 20 KeV, attenuation by the casing is substantially total. Between 20 KeV and 175 KeV, very significant differences in the three spectra indicate the effects of changing casing thickness. Above about 175-200 KeV the spectra have much more similar spectral shapes, with only minor differences due to the degree of Compton downscattering. This similar shape extends up to beyond the upper energy range shown in the graph (350 KeV) to the source energy level at 1.46 MeV. From FIG. 3 it can be seen that a ratio of count rates in each spectrum in a range below 175 KeV to the count rate in a range above 175 KeV is strongly affected by casing thickness.

FIG. 4 is a graph of casing thickness in inches versus a ratio of the count rate in the energy range 35-120 KeV to count rate in the energy range 180-325 KeV, as measured in a 2"×12" NaI (TL) detector in a natural gamma ray spectroscopy well logging tool. The formation outside the borehole is a potassium rich 16% porosity sand formation. The upper curve was obtained for varying thickness of 7" O.D. water filled casing in an 8" diameter borehole; the lower curve is for varying thickness of a 5.5" O.D. water filled casing in a 6" diameter borehole. Also shown are data points for a 5.5" water filled casing in a 10" water filled borehole and in a 10" cement filled borehole. FIG. 4 illustrates a method in which nominal casing size is known, and actual casing thickness can be determined from the ratio curve. It also shows that changes in borehole conditions, for a given casing, have little effect on the observed ratio, and hence casing thickness calculation. For very accurate casing thickness determinations, however, it may be possible to improve slightly the resulting measurement by correcting the observed casing ratio for non-casing related borehole changes if these parameters, such as cement thickness and type, are known.

Assume, in actual logging operations that a sonde is lowered to the bottom of a well in the manner set forth in FIG. 1. At a borehole depth of interest, the equipment is operated to obtain from the borehole measurement sysgem measurements from the naturally occurring gamma ray energy spectrum wherein the spectrum is divided into two energy response bands or windows. Suitable windows are exemplified above, and they are on opposite sides of approximately 175 KeV.

The scintillation detector is exposed to the gamma ray spectrum at the depth of interest for a specified interval. During this time, the counts in the two energy bands are summed, the ratio formed and then compared to a curve such as one of the curves in FIG. 4 to obtain a relative indication of casing thickness. It is particularly important to note that the count ratio in the two energy windows is considered, not the absolute count or count rate. Because the ratio is formed by measurements in both energy ranges from the same source of gamma rays, the source strength is normalized by taking the ratio. This normalization minimizes fluctuations from formation source strength, thickness of the cement (if any) around the casing, formation density, variations in lithology, changes in borehole fluid, dwell time of the tool at the particular depth, and leaves thickness of the casing as the primary variable. Slight changes in ratio may be observed due to changes in source type (potassium, uranium, or thorium), the magnitude of which may be related to the energy ranges selected for the ratio. If required, these changes can be normalized by using the calculated concentration of the three elements (or their daughter products) obtained simultaneously with the casing thickness ratio in the natural gamma spectroscopy tool.

Different ratio readings are taken as a function of depth in the well. As the sonde 10 is raised in the well, the thickness or weight of the casing can be obtained from the measured ratios, assuming the nominal casing diameter is known. The surface computer 18 (FIG. 1) is programmed to compute the casing thickness from the ratio and mathematical approximations to calibrated curves such as those in FIG. 4. Changes in the ratio indicate an externally or internally induced change in casing thickness. Assume that the sonde 10 is raised until it is adjacent a casing collar 38 shown in FIG. 1. The coupling reduces the low energy transmission and thereby alters the ratio. Assume that the casing has been placed in a well borehole for many years. When installed, it had a known thickness. However, it has been exposed to corrosion and is thereby thinned. The casing thickness monitor of this disclosure is especially useful in detecting weakened casing sections. Detection of perforations is also possible. Casing wear, resulting from drilling or workover operations, can also be detected. External, as well as internal, wear or corrosion is sensed with the measurement.

While the above technique is related to the gamma ray source being natural gamma radiation, it is also possible to use gamma rays induced in the formation by a neutron source in the logging tool, or scattered gamma rays from the formation originating in a gamma source in the logging tool, to carry out the above described casing thickness measurement. Hence the above concept is applicable to neutron, density, and pulsed neutron logging tools as well as to natural gamma ray spectroscopy tools.

While the foregoing is directed to the preferred embodiment, the scope thereof is determined by the claims which are attached below:

We claim:

1. A method of gamma ray spectral logging of a well borehole to determine the casing thickness of a cased well borehole, substantially independent of borehole conditions, comprising the steps of:
    (a) measuring in a detector in a logging tool the energy spectrum of gamma rays from outside a casing in the vicinity of a well borehole at a specified depth in the borehole, said gamma ray spectrum being divided into gamma ray intensities measured in two energy bands;
    (b) combining the gamma ray count rate data in one energy band in which photoelectric absorption in iron is significant with the gamma ray count rate data in one energy band where photoelectric absorption in iron is not significant to form an output indicative of casing thickness; and
    (c) determining the thickness of the casing at the specified depth in the well borehole from said output.

2. The method of claim 1 further including repeating the steps of claim 1 at different relative depths in the cased borehole and recording said casing thickness as a function of borehole depth.

3. The method of claim 1 wherein the two energy bands are respectively above and below a level at which photoelectric absorption per unit mass in iron and silicon become approximately equal for increasing energy levels.

4. The method of claim 1 wherein the two energy bands are primarily respectively above and below approximately 175 KeV.

5. The method of claim 4 wherein one energy band encompasses the range 35–120 KeV and the other band encompasses the range 180–325 KeV.

6. The method of claim 1 wherein said gamma rays from outside the casing occur as a result of natural radioactivity.

7. The method of claim 1 wherein said gamma rays from outside the casing occur as a result of induced reactions caused by neutrons originating in the logging tool.

8. The method of claim 1 wherein gamma rays from outside the casing occur as a result of scattering of gamma rays originating in a source in the logging tool.

9. The method of claim 1 wherein said combining step forms a ratio of count rates in the two energy bands.

10. The method of claim 1 including the step of locating casing collars along the borehole as a function of casing thickness.

11. The method of claim 1 including the step of locating perforations along the casing in the borehole as a function of casing weight.

12. The method of claim 1 wherein said determining step incorporates as a reference the nominal casing diameter.

13. The method of claim 1 wherein said determining step incorporates as a reference the elements from which said gamma rays from outside the casing originate.

14. The method of claim 1 wherein said determining step incorporates as a reference the thickness and composition of the material in the annular space between the casing and formation.

15. An apparatus for determining the thickness of casing in a well borehole, comprising:
 (a) passive gamma ray detector means adapted to be lowered in a borehole having a casing therein and response to formation gamma radiaton of energy levels ranging from zero up to in excess of 200 KeV;
 (b) pulse forming means cooperative with said detector means for forming an observed gamma ray spectrum as a function of energy level and pulse frequency at specified energy levels;
 (c) means defining high and low energy ranges wherein the low energy range is below approximately 175 KeV and the high energy range is primarily thereabove; and
 (d) means provided with the pulse counts in the high and low energy ranges for forming an output signal indicative of casing thickness.

16. A method of logging a cased well borehole to determine the thickness of well casing therein utilizing gamma ray techniques and comprising the steps of:
 (a) detecting in a well borehole naturally occurring gamma radiation from earth formations surrounding the borehole and separating said detected gamma radiation into an intensity versus energy spectrum of components;
 (b) deriving from said spectrum an output signal representative of the preferential photoelectric absorption of gamma rays by iron in the well casing relative to the absorption of gamma rays by other borehole and earth formation constituent elements, at gamma ray energies below approximately 175 KeV; and
 (c) determining as a function of said output signal, from a predetermined relationship, the thickness of the well casing at the depth level in the well borehole where said detecting step is performed.

* * * * *